(12) United States Patent
Perg

(10) Patent No.: US 6,760,710 B1
(45) Date of Patent: Jul. 6, 2004

(54) PROCESS AND PRODUCTS PRODUCED THEREBY, APPARATUS, AND ARTICLES OF MANUFACTURE, FOR COMPUTERIZED CONVERSION OF PREFERRED-RETURN INSTRUMENTS

(75) Inventor: Wayne F. Perg, Amado, AZ (US)

(73) Assignee: New Market Solutions, Phoenix, AZ (US)

( * ) Notice: Subject to any disclaimer, the term of this patent is extended or adjusted under 35 U.S.C. 154(b) by 0 days.

(21) Appl. No.: 09/283,102

(22) Filed: Mar. 31, 1999

(51) Int. Cl.[7] .............................................. G06F 17/60
(52) U.S. Cl. ........................... 705/37; 705/30; 705/31; 705/32; 705/33; 705/35; 705/36; 705/37; 705/38; 705/39; 705/40; 705/41; 705/42; 705/43; 705/44; 705/45
(58) Field of Search ...................... 705/37, 38, 30–33, 705/35–45

(56) References Cited

U.S. PATENT DOCUMENTS

| | | | | |
|---|---|---|---|---|
| 4,742,457 A | * | 5/1988 | Leon ........................... | 364/408 |
| 5,504,483 A | * | 4/1996 | Hoffmann ..................... | 705/37 |
| 5,915,209 A | * | 6/1999 | Lawrence .................... | 455/31.2 |
| 6,029,146 A | * | 2/2000 | Hawkins ....................... | 705/35 |
| 6,195,647 B1 | * | 2/2001 | Martyn . ...................... | 705/37 |

* cited by examiner

Primary Examiner—Hyung Sough
Assistant Examiner—Richard Fults
(74) Attorney, Agent, or Firm—Peter K. Trzyna, Esq.

(57) ABSTRACT

An improved process for the computerized conversion of preferred-return constant-dollar financial instruments into equivalent nominal-dollar instrument. The method includes providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation and programming the processor to control the apparatus to receive the input data and produce the output data by steps including: respectively entering characteristics corresponding to a constant-dollar instrument; computing with said apparatus to convert the input electrical data to the output electrical data corresponding to characteristics of an equivalent nominal-dollar instrument, the computing including computing a nominal payment schedule for the nominal-dollar instrument; wherein the process does not essentially include a step using a standard convention for expressing an interest rate or rate of return to determine the characteristics of the equivalent nominal-dollar instrument; and generating documentation of the nominal-dollar instrument including at least some of the computed characteristics for the nominal-dollar instrument.

11 Claims, 3 Drawing Sheets

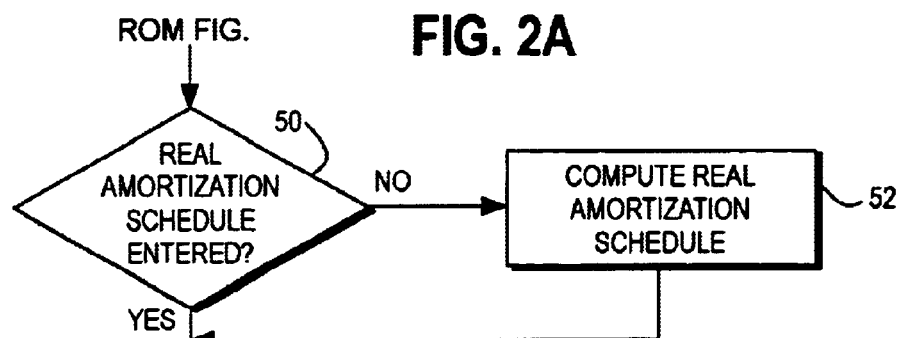
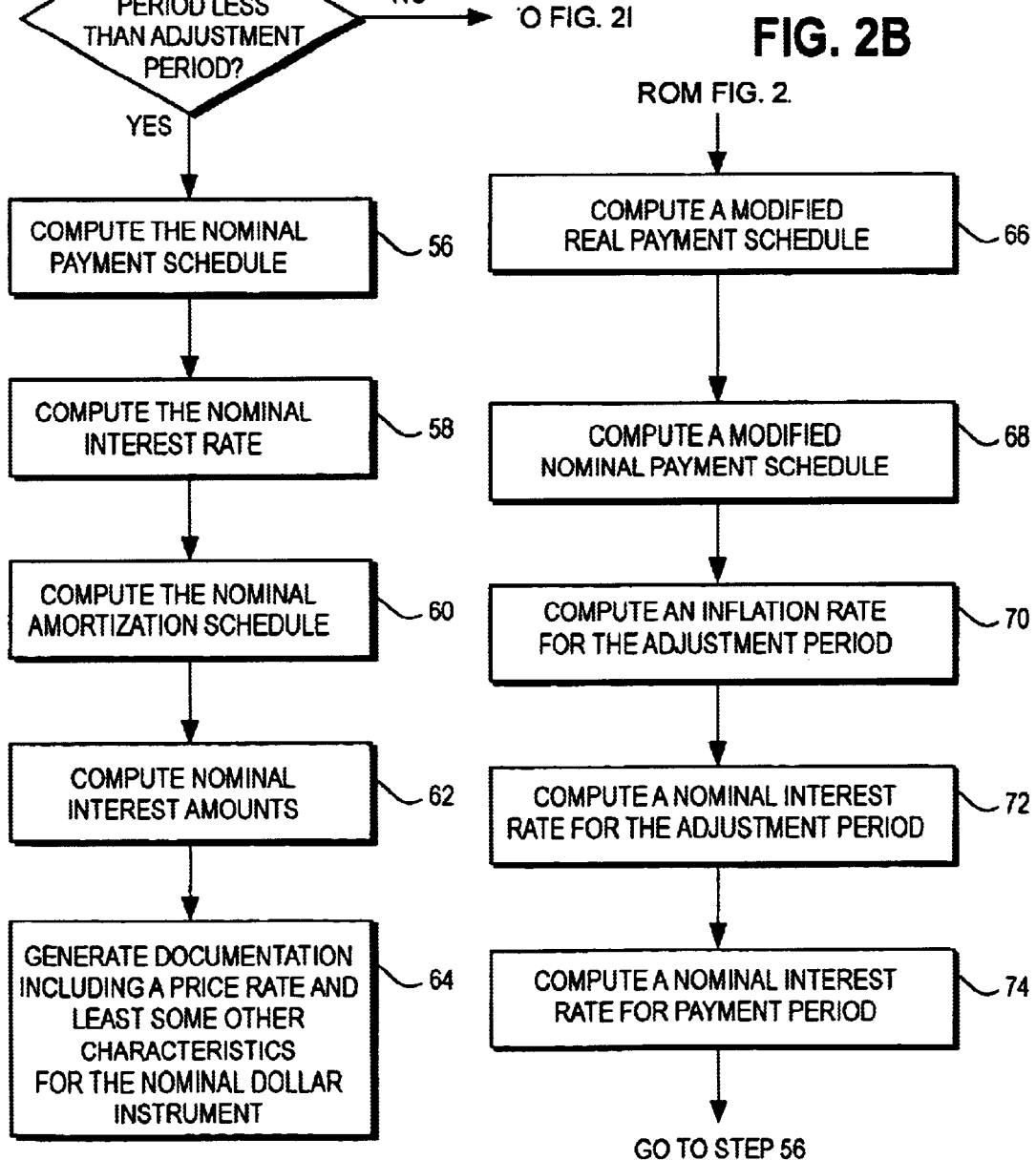

PROCESS AND PRODUCTS PRODUCED THEREBY, APPARATUS, AND ARTICLES OF MANUFACTURE, FOR COMPUTERIZED CONVERSION OF PREFERRED-RETURN INSTRUMENTS

FIELD OF THE INVENTION

The present invention pertains to an electrical digital computer machine and a data processing system, methods involving the same and products produced thereby, as well as data structures and articles of manufacture pertaining thereto, pertaining to computerized aspects of financial fields of creating and servicing financial instruments, securities exchanges, exchange trading and financial markets. More particularly, this invention relates to a digital electrical data processing system for an improved process for converting constant-dollar financial instruments into equivalent nominal-dollar instruments and connected electrical digital computer apparatus, including a service digital electrical computer apparatus.

Even more particularly, this invention finds utility extending at least to the following: (1) creating and servicing financial instruments; (2) trading, matching, or bidding; (3) credit (risk) processing and credit transactions; (4) associated document generating; and further to (5) point of sale terminal activity, and (6) having security or user identification provision (password entry, etc.); as well as (7) price determination; (8) interconnecting terminals; (9) inventory monitoring; (10) electronic shopping; (11) inventory management; (12) accounting, (13) such as bill or statement preparation.

BACKGROUND OF THE INVENTION

Preferred-return constant-dollar financial instruments have the ability to shift the risk-return tradeoff for investors, enabling investors to increase their returns while reducing their risk. Constant-dollar instruments also have the ability to increase cash flow and reduce default risk for funds users, thus increasing their returns and reducing their risk. However, before preferred-return constant-dollar instruments can be employed, they must be converted into equivalent nominal-dollar instruments.

In the prior art, there is a disclosed process (U.S. Pat. No. 5,237,500) for the exact conversion of preferred-return constant-dollar instruments into equivalent nominal-dollar instruments. The inventors of the present invention have improved this disclosed process by eliminating a step that was considered to be vital in the disclosed process. The present invention also significantly simplifies the conversion process.

In addition to eliminating a step that was considered vital and simplifying the disclosed process, the inventors of the present invention have added the connection of one or more second digital computer apparatus to the first digital computer apparatus that converts constant-dollar instruments into equivalent nominal-dollar instruments. The functions of these second digital computer apparatus include: (1) servicing the equivalent nominal-dollar instruments; (2) trading the equivalent nominal-dollar instruments; (3) brokering the purchase and sale of the equivalent nominal-dollar instruments; (4) credit rating the equivalent nominal-dollar instruments; (5) calculating financial data on the equivalent nominal-dollar instruments for the issuer; (6) calculating financial and portfolio data on the equivalent nominal-dollar instruments for owners of the securities; and, (7) reporting on the equivalent nominal-dollar instruments.

SUMMARY OF THE INVENTION

In view of the foregoing, it is an object of the present invention to provide an improved process for computerized conversion of preferred-return constant-dollar financial instruments into equivalent nominal-dollar instruments.

It is another object of the present invention to provide a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation, the processor being controlled by a program to form circuitry in the processor for controlling the apparatus to receive the input data and to produce the output data.

It is yet another object of the present invention to compute with said apparatus to convert the input electrical data to the output electrical data corresponding to characteristics of an equivalent nominal dollar instrument, the computing including computing a nominal payment schedule for the nominal dollar instrument wherein the process does not essentially include a step using a standard convention for expressing an interest rate or rate of return to determine the characteristics of the equivalent nominal dollar instrument.

It is yet a further object of the present invention to generate, by computer means, documentation of the nominal dollar instrument including at least some of the computed characteristics for the nominal dollar instrument.

It is yet an additional object of the present invention to compute to convert a constant dollar instrument into an equivalent nominal dollar instrument wherein the process does not include a step using a standard convention for expressing an interest rate or rate of return to determine the characteristics of the equivalent nominal dollar instrument.

It is still an additional object of the present invention to provide means for inputting an inflation measure, a base period for the inflation measure, a frequency of adjustment, and at least two from a group consisting of a price, a real interest rate, a payment period, a real payment schedule and a real amortization schedule.

It is still another object of the present invention to provide a computerized means for computing (alternatively or in any combination) a price for the nominal dollar instrument, a real payment schedule and/or a payment period.

It is still another object of the present invention to provide a computerized means for comparing a payment period to an adjustment period, and if the payment period is not less than the adjustment period, then computing the nominal payment schedule using an inflation period, then computing a real rate of interest for the adjustment period; computing a modified real payment schedule with a modified payment period equal to the adjustment period and with a present value of payments equal to a price; computing a modified nominal payment schedule equivalent to the modified real payment schedule using the inflation measure and the inflation base period; computing an inflation rate for the adjustment period; computing a nominal interest rate for the adjustment period using the inflation rate for the adjustment period and the real interest rate for the adjustment period; computing a nominal interest rate for the payment period using the payment period and the adjustment period; and computing the nominal payment schedule from the modified nominal payment schedule using the nominal interest rate for the payment period and the nominal interest rate for the adjustment period.

It is yet another object of the present invention to provide computerized means for generating documentation including (alternatively or in any combination) a price, a nominal payment schedule, a nominal interest rate, nominal interest amounts, and/or a nominal amortization schedule.

It is yet still another object of the present invention to provide a service digital electrical computer apparatus including a service digital computer having a service processor, the service processor electrically connected to a service memory device for storing and retrieving machine-readable signals, to a service input device for receiving service input data and converting the service input data into service input electrical data, and to a service output device for converting service output electrical data into service output having a service visual presentation, the service processor being controlled by a service program to form service circuitry in the service processor for controlling the service apparatus to receive the service input data and to produce the service output data; inputting, as a portion of the second input data, the characteristics of the equivalent nominal dollar instrument, payments for the equivalent nominal dollar instrument, and inflation measure data; computing a future payment amount for the equivalent nominal dollar instrument; and generating output including future payment amount for the equivalent nominal dollar instrument.

It is moreover another object of the present invention to provide a trading digital electrical computer apparatus including a trading digital computer having a trading processor, the trading processor electrically connected to a trading memory device for storing and retrieving machine-readable signals, to a trading input device for receiving trading input data and converting the trading input data into trading input electrical data, and to a trading output device for converting trading output electrical data into trading output having a trading visual presentation, the trading processor being controlled by a trading program to form trading circuitry in the trading processor for controlling the trading apparatus to receive the trading input data and to produce the trading output data; inputting, as a portion of the trading input data, purchase orders and sell orders for the equivalent nominal dollar instrument; computing, from the input electrical data, a real interest rate for the equivalent nominal dollar instrument; computing, from the real interest rate, a price for the equivalent nominal dollar instrument; and generating output including trade confirmation documentation, including the price, for any trade of the equivalent nominal dollar instrument.

It is additionally still another object of the present invention to provide a broker's digital electrical computer apparatus including a broker's digital computer having a broker's processor, the broker's processor electrically connected to a broker's memory device for storing and retrieving machine-readable signals, to a broker's input device for receiving broker's input data and converting the broker's input data into broker's input electrical data, and to a broker's output device for converting broker's output electrical data into broker's output having a broker's visual presentation, the broker's processor being controlled by a broker's program to form broker's circuitry in the broker's processor for controlling the broker's apparatus to receive the broker's input data and to produce the broker's output data; inputting, as a portion of the broker's input data, purchase orders and sell orders for the equivalent nominal dollar instrument; inputting, as a further portion of the broker's input data, a member from the group consisting of a price and a real interest rate, for the equivalent nominal dollar instrument; if the member is the real interest rate, then computing a price from the input electrical data, and if the member is the price, then computing the real interest rate from the input electrical data; computing, from the real interest rate, a price for the equivalent nominal dollar instrument; and generating output including trade confirmation documentation, including the price, for any trade of the equivalent nominal dollar instrument.

It is even more an object of the present invention to provide a credit rating agency's digital electrical computer apparatus including a credit rating agency's digital computer having a credit rating agency's processor, the credit rating agency's processor electrically connected to a credit rating agency's memory device for storing and retrieving machine-readable signals, to a credit rating agency's input device for receiving credit rating agency's input data and converting the credit rating agency's input data into credit rating agency's input electrical data, and to a credit rating agency's output device for converting credit rating agency's output electrical data into credit rating agency's output having a credit rating agency's visual presentation, the credit rating agency's processor being controlled by a credit rating agency's program to form credit rating agency's circuitry in the credit rating agency's processor for controlling the credit rating agency's apparatus to receive the credit rating agency's input data and to produce the credit rating agency's output data; inputting, as a portion of the credit rating agency's input data, the computed characteristics for the nominal dollar instrument; inputting, as a further portion of the credit rating agency's input data, issuer financial data; computing, from the credit rating agency's input data, a rating for the nominal dollar instrument that reflects a probability of a default by the issuer; and generating output including the rating for the nominal dollar instrument.

It is even moreover an object of the present invention to provide a issuer's digital electrical computer apparatus including a issuer's digital computer having a issuer's processor, the issuer's processor electrically connected to a issuer's memory device for storing and retrieving machine-readable signals, to a issuer's input device for receiving issuer's input data and converting the issuer's input data into issuer's input electrical data, and to a issuer's output device for converting issuer's output electrical data into issuer's output having a issuer's visual presentation, the issuer's processor being controlled by a issuer's program to form issuer's circuitry in the issuer's processor for controlling the issuer's apparatus to receive the issuer's input data and to produce the issuer's output data; inputting, as a portion of the issuer's input data, the computed characteristics for the nominal dollar instrument; inputting, as a further portion of the issuer's input data, an amount of the nominal dollar instrument for issue and a date for the issue; computing, from the issuer's input data and subsequent to issuance of the amount of the nominal dollar instrument, an interest sum for the amount of the nominal dollar instrument issued; and generating output including the interest sum for the nominal dollar instrument.

It is even moreover an object of the present invention to provide a securities owner's digital electrical computer apparatus including a securities owner's digital computer having a securities owner's processor, the securities owner's processor electrically connected to a securities owner's memory device for storing and retrieving machine-readable signals, to a securities owner's input device for receiving securities owner's input data and converting the securities owner's input data into securities owner's input electrical data, and to a securities owner's output device for converting securities owner's output electrical data into securities owner's output having a securities owner's visual presentation, the securities owner's processor being controlled by a securities owner's program to form securities owner's circuitry in the securities owner's processor for controlling the securities owner's apparatus to receive the securities owner's input data and to produce the securities owner's output data; inputting, as a portion of the securities owner's input data, (alternatively or in any combination) the computed characteristics for the nominal dollar instrument, a book amount of the nominal dollar instrument, issuer payments received, and/or a current real rate of interest for the nominal dollar instrument; computing, (alternatively or in any combination) from the securities owner's input data, an interest sum and a principle balance for the nominal dollar instrument, a value for a portfolio including the amount of the nominal dollar instrument, and/or a price for the nominal dollar instrument; and generating output including (alternatively or in any combination) the interest sum and the principle balance for the nominal dollar instrument, the value for the portfolio, and/or the price for the nominal dollar instrument.

Furthermore, it is moreover an object of the present invention to provide a reporting digital electrical computer apparatus including a reporting digital computer having a reporting processor, the reporting processor electrically connected to a reporting memory device for storing and retrieving machine-readable signals, to a reporting input device for receiving reporting input data and converting the reporting input data into reporting input electrical data, and to a reporting output device for converting reporting output electrical data into reporting output having a reporting visual presentation, the reporting processor being controlled by a reporting program to form reporting circuitry in the reporting processor for controlling the reporting apparatus to receive the reporting input data and to produce the reporting output data; inputting, as a portion of the reporting input data, information output by at least one of said output data for the nominal dollar instrument; generating, from the reporting input data, a reformatted version of the reporting input data; communicating, by digital means, a transmission of the reformatted version of the reporting input data; and generating output at a recipient receiver device of the reformatted version of the reporting input data.

BRIEF DESCRIPTION OF THE DRAWINGS

FIG. 2A is an illustration of a flow chart for an embodiment of the present invention;

FIG. 2B is an illustration of a flow chart for an embodiment of the present invention.

DETAILED DESCRIPTION OF A PREFERRED EMBODIMENT

The inventors have provided the present invention in order to facilitate the conversion of preferred-return constant-dollar financial instruments into equivalent nominal-dollar instruments by a process that eliminates a step that was previously thought to be vital and is simpler than the previously known process. In addition, the digital electrical computer apparatus that performs this new, simpler conversion process has been integrated into the associated digital electrical computer apparatus utilized by the servicing entity, the issuer, the accountants for the issuer, the investment banker, financial reporting firms, the exchange, brokers, rating agencies, investors and the accountants for the investors.

Figure 1:
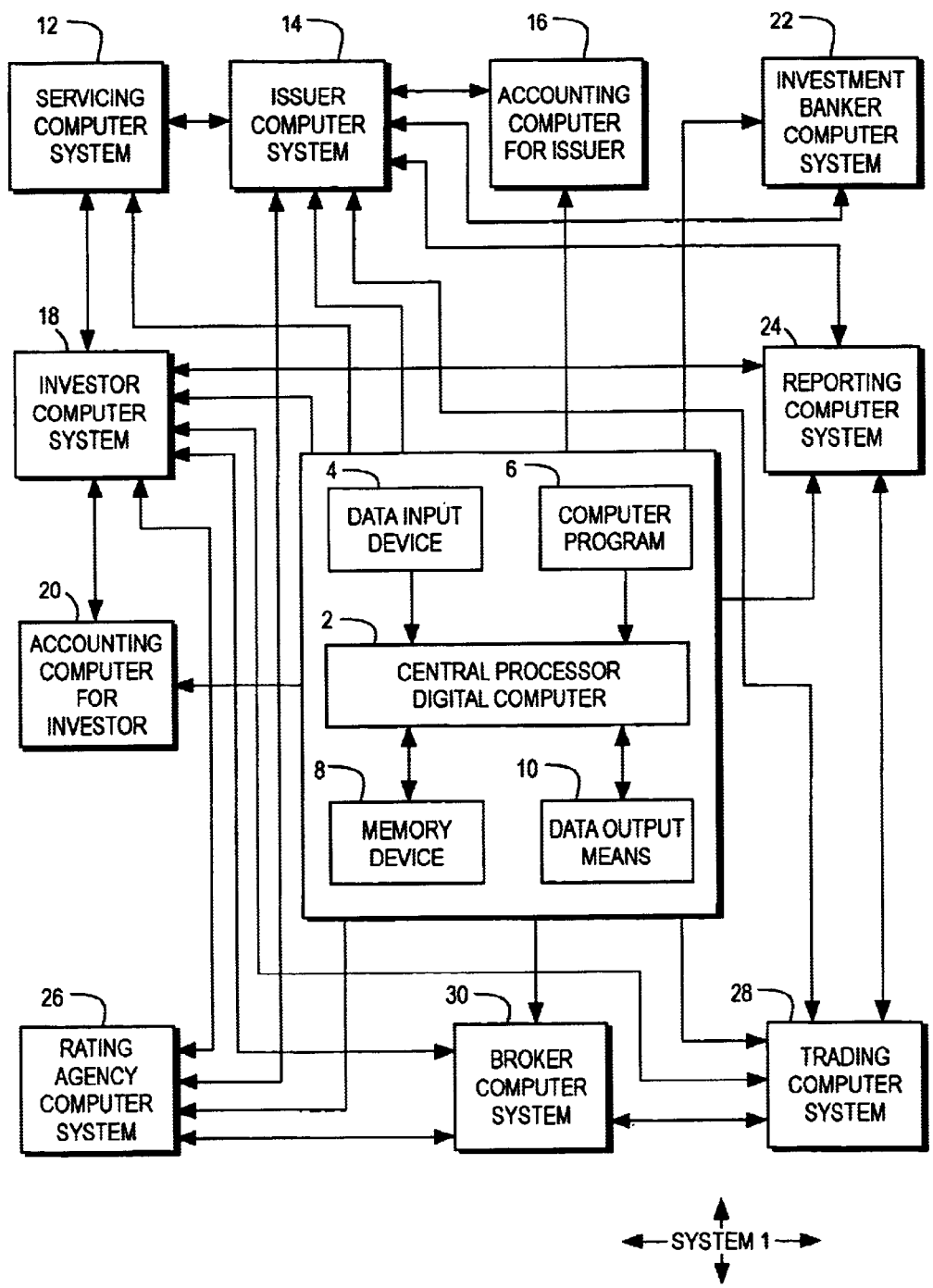
FIG. 1 is an illustration of an embodiment of the present invention.

Referring now to FIG. 1 an embodiment of the present invention is illustrated so as to indicate how to make and use the computerized system for converting constant-dollar financial instruments into equivalent nominal-dollar instruments. At the heart of the invention is a digital electrical computer 2. As illustrated herein, the invention involves one computer, but it should be understood that the same invention can be carried out with multiple computers as well, and this is considered explicitly equivalent to a one-computer implementation. The digital electrical computer 2 has a memory device 8, such as a hard drive, diskette and disk drive, etc., and a data input device 4, such as a keyboard, a data output means 10 such as a printer and/or monitor. The digital electrical computer 2 is controlled by a computer program 6.

Note that the computer program 6 is preferably in software, but can alternatively be wholly or partially in hardware. A software approach, e.g., the program stored on a diskette article of manufacture, provides a useful facility for inputting or storing data structures that are produced the computer program 6, as well as for inputting a software embodiment of the present invention. Of course, storing the computer program 6 in a software medium is optional because the same result can be obtained by replacing the computer program 6 in a software medium with the computer program 6 in a hardware storage device, e.g., by burning the computer program 6 into a ROM, using conventional techniques to convert software into an ASIC or FPGA, etc., as would be readily understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd I. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" can include inputting data for processing by the computer program 6 or inputting in the computer program 6 code itself. The software embodiment is preferable for flexibility, but these approaches are equivalent.

Other digital electrical computer systems (12, 14, 16, 18, 20, 22, 24, 26, 28 and 30) may be connected to the first digital electrical computer system and each other. The connections may be through a communications system such as the Internet or by other means. Each digital electrical computer system includes a central processor digital computer, a data input device, computer program, memory device and data output means. These other digital electrical computer systems include: a servicing computer system 12, an issuer computer system 14, an accounting computer system for the issuer 16, an investor computer system 18, an accounting computer system for the investor 20, an investment banker computer system 22, a reporting computer system 24, a rating agency computer system 26, a broker computer system 28, and a trading computer system 30.

Figure 2:
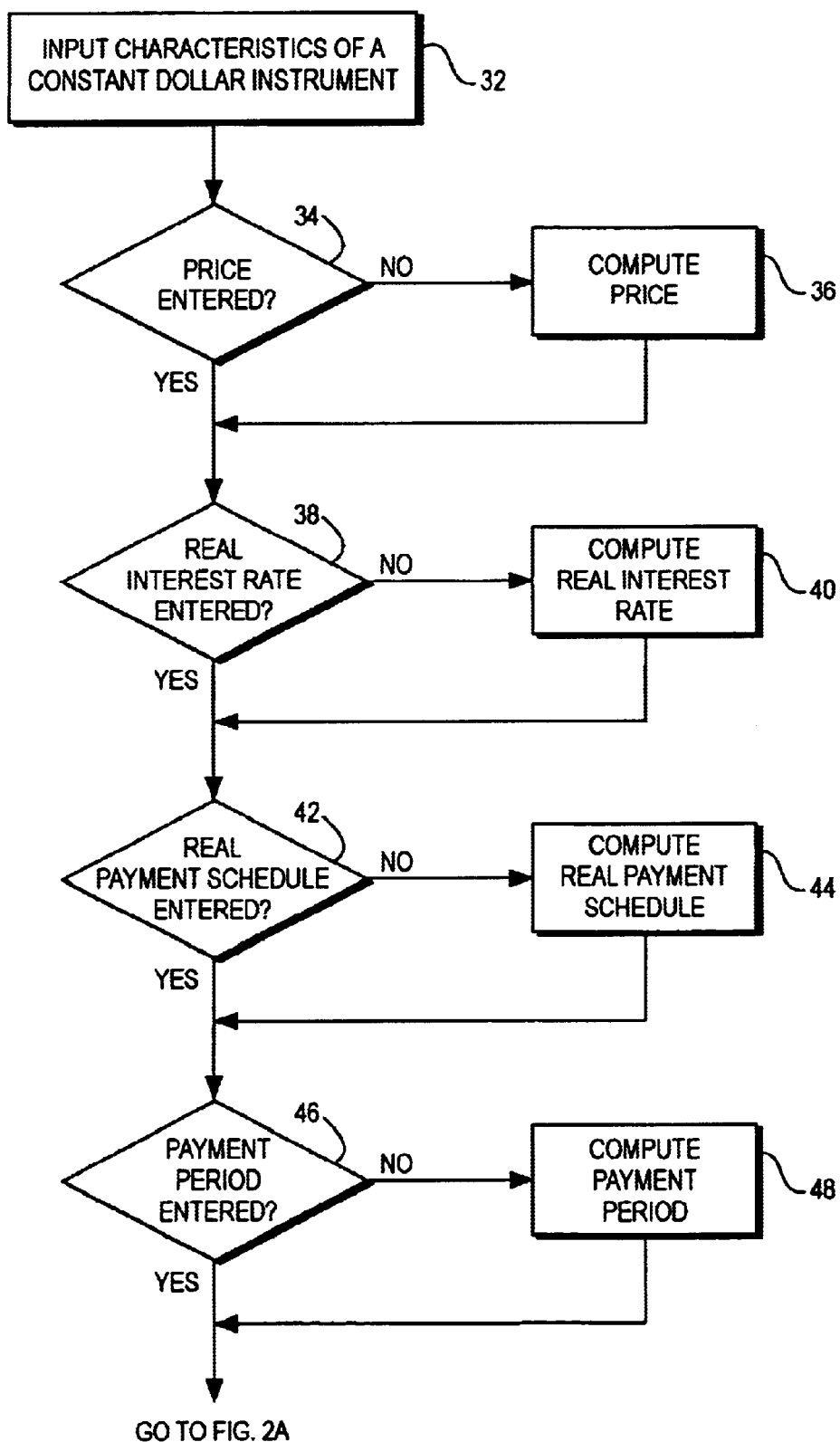
FIG. 2 is an illustration of a flow chart for an embodiment of the present invention.

Referring now to FIG. 2, users of the conversion process first input 32 characteristics of a constant-dollar instrument.

The system 1 then determines 34 whether or not a price was entered. If a price was not entered, the system 1 computes 36 a price. The system 1 then determines 38 whether or not a real interest rate was entered. If a real interest rate was not entered, the system 1 computes 40 a real interest rate. The system 1 then determines 42 whether or not a real payment schedule was entered. If a real payment schedule was not entered, the system 1 computes 44 a real payment schedule. The system 1 then determines 46 whether or not a payment period was entered. If a payment period was not entered, the system 1 computes 48 a payment period, which leads to FIG. 2A.

Turning now to FIG. 2A, from step 46 or 48, the system 1 determines 50 whether or not a real amortization schedule was entered. If a real amortization schedule was not entered, the system 1 computes 52 a real amortization schedule. The system 1 then determines 54 whether the payment period is less than the adjustment period. If the answer is yes, it leads to FIG. 2B. If the answer is no, the system 1 computes 56 the nominal payment schedule, computes 58 the nominal interest rate, computes 60 the nominal amortization schedule, computes 62 nominal interest amounts, and generates documentation 64 including a price and at least some of the characteristics for the equivalent nominal-dollar instrument.

Turning now to FIG. 2B, from a yes on step 54 the systems computes 66 a modified real payment schedule, computes 68 a modified nominal payment schedule, computes 70 an inflation rate for the adjustment period, computes 72 a nominal interest rate for the adjustment period, and computes 74 a nominal interest rate for a payment period, which leads to step 56.

In addition to eliminating the step of using a standard convention for expressing an interest rate or rate of return that was thought to be vital in the previously disclosed process, the present invention significantly simplifies the process of converting a preferred-return constant-dollar financial instrument into an equivalent nominal-dollar instrument.

I claim:

1. Improved process for computerized conversion of preferred-return financial instruments, the process including the steps of:

providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation, the processor being controlled by a program to form circuitry in the processor for controlling the apparatus to receive the input data and to produce the output data;

inputting, as a portion of the input data, characteristics corresponding to a constant dollar instrument;

computing with said apparatus to convert the input electrical data to the output electrical data corresponding to characteristics of an equivalent nominal dollar instrument, the computing including computing a nominal payment schedule for the nominal dollar instrument;

wherein the conversion does not include a step using a standard convention for expressing an interest rate or rate of return to determine the characteristics of the equivalent nominal dollar instrument; and generating documentation of the nominal dollar instrument including at least some of the computed characteristics for the nominal dollar instrument.

2. The process of claim 1, wherein the process does not include a step using a standard convention for expressing an interest rate or rate of return to determine the characteristics of the equivalent nominal dollar instrument.

3. The process of claim 2, wherein the step of inputting includes inputting an inflation measure, a base period for the inflation measure, a frequency of adjustment, and at least two from a group consisting of a price, a real interest rate, a payment period, a real payment schedule and a real amortization schedule.

4. The process of claim 2, wherein the step of computing includes computing a price for the nominal dollar instrument.

5. The process of claim 2, wherein the step of computing includes computing a real payment schedule.

6. The process of claim 2, wherein the step of computing includes computing a payment period.

7. The process of claim 2, wherein the step of computing includes comparing a payment period to an adjustment period, and if the payment period is not less than the adjustment period, then computing the nominal payment schedule using an inflation measure and an inflation base period, and if the payment period is less than the adjustment period, then computing a real rate of interest for the adjustment period;

computing a modified real payment schedule with a modified payment period equal to the adjustment period and with a present value of payments equal to a price;

computing a modified nominal payment schedule equivalent to the modified real payment schedule using the inflation measure and the inflation base period;

computing an inflation rate for the adjustment period;

computing a nominal interest rate for the adjustment period using the inflation rate for the adjustment period and the real interest rate for the adjustment period;

computing a nominal interest rate for the payment period using the payment period and the adjustment period; and computing the nominal payment schedule from the modified nominal payment schedule using the nominal interest rate for the payment period and the nominal interest rate for the adjustment period.

8. The process of claim 2, wherein the step of computing with said apparatus includes computing a price.

9. The process of claim 2, wherein the step of computing with said apparatus includes computing a nominal interest rate.

10. The process of claim 2, wherein the step of computing with said apparatus includes computing nominal interest amounts.

11. The process of claim 2, wherein the step of computing with said apparatus includes computing a nominal amortization schedule.

* * * * *